(12) United States Patent
Stolfo

(10) Patent No.: US 7,996,288 B1
(45) Date of Patent: Aug. 9, 2011

(54) METHOD AND SYSTEM FOR PROCESSING RECURRENT CONSUMER TRANSACTIONS

(75) Inventor: Salvatore J. Stolfo, Ridgewood, NJ (US)

(73) Assignee: iPrivacy, LLC, New York, NY (US)

( * ) Notice: Subject to any disclaimer, the term of this patent is extended or adjusted under 35 U.S.C. 154(b) by 3607 days.

(21) Appl. No.: 09/713,506

(22) Filed: Nov. 15, 2000

(51) Int. Cl.
*G06Q 40/00* (2006.01)

(52) U.S. Cl. ............................. 705/35; 705/38

(58) Field of Classification Search .................... 705/35, 705/38, 39, 40
See application file for complete search history.

(56) References Cited

U.S. PATENT DOCUMENTS

| | | |
|---|---|---|
| 5,420,926 A | 5/1995 | Low et al. |
| 5,557,518 A | 9/1996 | Rosen |
| 5,621,797 A | 4/1997 | Rosen |
| 5,671,280 A | 9/1997 | Rosen |
| 5,703,949 A | 12/1997 | Rosen |
| 5,715,314 A | 2/1998 | Payne et al. |
| 5,724,424 A | 3/1998 | Gifford |
| 5,729,594 A | 3/1998 | Klingman |
| 5,732,400 A | 3/1998 | Mandler et al. |
| 5,754,938 A | 5/1998 | Herz et al. |
| 5,754,939 A | 5/1998 | Herz et al. |
| 5,768,391 A | 6/1998 | Ichikawa |
| 5,784,565 A | 7/1998 | Lewine |
| 5,794,221 A | 8/1998 | Egendorf |
| 5,802,497 A | 9/1998 | Manasse |
| 5,809,144 A | 9/1998 | Sirbu et al. |
| 5,815,665 A | 9/1998 | Teper et al. |
| 5,862,325 A | 1/1999 | Reed et al. |
| 5,878,139 A | 3/1999 | Rosen |
| 5,878,141 A | 3/1999 | Daly et al. |
| 5,883,810 A | 3/1999 | Franklin et al. |
| 5,887,060 A | 3/1999 | Ronning |
| 5,899,980 A | 5/1999 | Wilf et al. |
| 5,903,721 A | 5/1999 | Sixtus |
| 5,907,677 A | 5/1999 | Glenn et al. |
| 5,961,593 A | 10/1999 | Gabber et al. |
| 5,982,891 A | 11/1999 | Ginter et al. |

(Continued)

FOREIGN PATENT DOCUMENTS

EP   0747867 A1   11/1996

(Continued)

OTHER PUBLICATIONS

U.S. Appl. No. 60/213,063, filed Jun. 21, 2000.*

(Continued)

*Primary Examiner* — Lalita M Hamilton
(74) *Attorney, Agent, or Firm* — Ward & Olivo LLP

(57) ABSTRACT

In a communications network-based system, a method for securely processing recurrent consumer transactions. Merchant-specific proxy financial account information is provided to a user and maintained in a database, the proxy financial account information valid for transactions at a single merchant only. A request for transaction approval is received from a merchant, the request including a merchant identifier and a user's proxy financial account information. The database is queried to determine if the proxy financial account is valid for the merchant seeking transaction approval. The proxy financial account information may include a credit card account number and/or a proxy billing address linked to a financial account. A merchant identifier string, identifying the authorized merchant, may be encoded in the credit card number and/or proxy billing address. A communications network-based system and software program for implementing the present invention are also disclosed.

35 Claims, 4 Drawing Sheets

U.S. PATENT DOCUMENTS

| | | | |
|---|---|---|---|
| 6,000,832 A * | 12/1999 | Franklin et al. | 700/232 |
| 6,006,200 A | 12/1999 | Boies et al. | |
| 6,014,646 A | 1/2000 | Vallee | |
| 6,061,789 A | 5/2000 | Hauser et al. | |
| 6,085,168 A | 7/2000 | Mori et al. | |
| 6,101,484 A | 8/2000 | Halbert et al. | |
| 6,125,352 A | 9/2000 | Franklin et al. | |
| 6,128,663 A | 10/2000 | Thomas | |
| 6,148,343 A | 11/2000 | Lewine | |
| 6,170,879 B1 | 1/2001 | Rawlings | |
| 6,202,159 B1 | 3/2001 | Ghafir et al. | |
| 2002/0035548 A1 * | 3/2002 | Hogan et al. | 705/64 |
| 2002/0116341 A1 * | 8/2002 | Hogan et al. | |

FOREIGN PATENT DOCUMENTS

| | | |
|---|---|---|
| EP | 0855 659 A1 | 7/1998 |
| JP | 10-320646 | 12/1998 |
| WO | WO 97/15885 | 5/1997 |
| WO | WO 97/26612 | 7/1997 |
| WO | WO 01/13275 | 2/2001 |

OTHER PUBLICATIONS

Peter H. Lewis, "Internet Hide and Seek," N.Y. Times, Apr. 8, 1999, at G1,2.

Tina Kelley, "Buying is Only a Click (Oops!) Away," N.Y. Times, Feb. 8, 1999, at G1,2.

Denise Caruso, "Digital Commerce," N.Y. Times, Mar. 1, 1999, at C4.

Bob Tedeschi, "E-Commerce Report," N.Y. Times, Mar. 8, 1999, at C4.

John Markoff, "Novell to Offer Data-Privacy Technology for Internet," N.Y. Times, Mar. 22, 1999, at C1.

Lorrie Faith Cranor, "Internet Privacy: A Public Concern," pp. 13-18. Communications of the ACM, Feb. 1999, vol. 42, No. 2.

Platform for Privacy Preferences (P3P) Syntax Specification (Working Draft Apr. 7, 1999).

Anonymizer.com, Privacy is Your Right (visited Apr. 8, 1999) <http://www.anonymizer.com/3.0/index.shtml>.

Crowds, Anonymity Loves Company (visited Apr. 8, 1999) <http://www.research.att.com/projects/crowds/>.

Lucent Personalized Web Assistant (visited Apr. 8, 1999) <http://www.bell-labs.com/project/lpwa/>.

Zero-Knowledge System Announces Freedom (visited Apr. 8,1999) <http://www.zeroknowledge.com>.

Novell Previews digitalme: Directory enabled Technology for Personal Control of Identity on the Internet, Mar. 22, 1999 <http://www.novell.com>.

Privaseek, The First Consumer Infomediary (visited Mar. 10, 1999) <http://www.privaseek.com>.

mValue, Where Privacy Pays . . . (visited Feb. 25, 2000) <http://www.mvalue.com/index.jsp>.

* cited by examiner

METHOD AND SYSTEM FOR PROCESSING RECURRENT CONSUMER TRANSACTIONS

FIELD OF THE INVENTION

The present invention relates generally to networks and, more particularly, to a method and system that allows users to securely order, and automatically re-order, products from merchants over a computer network, without revealing their true identities to those merchants or any other network users, and without compromising their financial information.

BACKGROUND OF THE INVENTION

As used herein, the term computer includes any device or machine capable of accepting data, applying prescribed processes to the data, and supplying the results of the processes. By way of example, but not limitation, the term "computer" includes mainframe computers, servers, personal computers, laptops, personal digital assistants, portable phones, cell phones and calculators. The term "communications network" is also meant in a broad sense, and may include any suitable technology for information transmission, including electrical, electromagnetic and optical technologies. Such a communications network may link computers, e.g., a LAN or WAN. Although the invention is described with particular reference to an open network, such as the Internet, it may also be used in other networks, internets and intranets.

The Internet continues to increase in importance as a place for business, offering a wide variety of information and services to potential customers. However, as an open network, the Internet provides opportunities to legally and illegally collect and use vast amounts of information which people consider both private and personal; and increasing concerns about privacy, fraud and security online could inhibit the continued growth of business to consumer "electronic commerce."

Currently, shopping, browsing and other information-sharing activities on the Internet expose users to unwanted collection of their private and personal information, from which their identities, activities, behaviors and preferences can be ascertained. Perhaps most alarming is the fact that a user's financial information (e.g., credit card numbers, debit account numbers, etc.) may be stolen from merchant databases. The specter of this type of thievery is perceived as a fundamental threat to personal freedoms and a potential impediment to the growth of e-commerce.

The present inventor's U.S. patent application Ser. No. 09/360,812, which is hereby incorporated by reference, discloses a system and method for anonymous Internet transactions. This private e-commerce system provides for private surfing, private payments, and private shipping. Users can shop at online web sites anonymously, select products for purchase, pay privately and securely, and ship the selected products to a location of their choice, without disclosing their personal and private information. In other cases, users may disclose their identity using a secure transaction system that prevents the disclosure of their real financial information (i.e., credit card account numbers). The means by which private payment mechanisms are provided may include a fraud reduction feature so that the financial information provided by a user for one purchase or transaction with one particular merchant cannot be reused for any other purchase or transaction even with the same merchant. This feature prevents the theft of the user's financial information and subsequent fraudulent use of that information by unauthorized third parties or thieves. For example, in the current state of e-commerce on the web, users who provide their real name, address, and credit card information when making a purchase at a web retailer site risk the loss of this private information due to theft from the web retailer databases. This problem can be solved by providing "single-use proxy financial information" from the user's bank or credit card company (that may be linked to a proxy identity in the case of a totally private transaction). Any attempt to reuse this "single-use proxy financial information" is foiled by the bank or credit card authorization process which rejects any such transaction.

Such single-use systems rely on the generation and use of unique transaction information provided to the user by his bank or credit card company, and the storage for future reference by the bank or credit card company of this information to ensure the information is used exactly once, for a single transaction executed by the user. This unique transaction information can be provided by a number of alternative means, and "communicated" to and by standard transacting and payment systems. For illustrative purposes the present invention is discussed in the context of credit card payment systems, but the principles discussed herein are equally applicable to other payment means (e.g., debit card payments, e-cash payments, etc.).

Single-use transaction information typically is a unique "proxy credit card number" generated when a user makes a transaction. In such an embodiment, a distinct number, linked to a real user account, is provided to the user for each transaction initiated. Such transactions are authorized by the issuing bank or credit card company, or the processor or acquirer who processes transactions on behalf of the bank or credit card issuer, when the transaction is submitted for authorization. In this case, the billing information associated with the financial transaction need not include the user's true billing address in order for the transaction to be properly authorized, as discussed below.

Alternatively, the proxy credit card number assigned to a user may be a fixed or static number (as if it were a typical credit card account with plastic and magnetic strips) that does not vary from transaction to transaction, but the bank or credit card issuer provides a distinct "single-use proxy billing address" for each transaction. A "proxy Address Verification String", used for Address Verification System (AVS) processing in the normal course of authorizing credit card transactions may also be used. Indeed, other fields of information used in the normal course of payment authorization schemes can be used to provide one-time use information to prevent fraud, and/or provide a fully private payment mechanism.

Although these schemes are useful in providing secure, safe, convenient and private payment mechanisms for users of e-commerce systems over computer and communications networks, they create a difficult problem for a particular class of transactions. Some transactions between users and merchants, retailers or service providers (hereinafter collectively referred to as merchants) are executed directly once by the user, but are then "automatically resubmitted" at later times by the merchant. These recurrent consumer transactions or payments (collectively "recurrent transactions") are performed on a routine basis by merchants and normally involve the submission of financial and personal information previously provided once by a user. This information is typically stored in merchant databases for future use. Examples of such transactions include monthly-billed service contracts and "split billing" among multiple fulfillment orders (in which a portion of the full transaction amount is billed piecemeal while portions of an order are available in inventory and are separately shipped). Since the very nature of a private payment scheme based upon "single-use proxy financial information" is to disallow the reuse of the proxy financial information first provided by the user's bank or credit card company, the second time a bank or credit card issuer receives and processes the single-use proxy financial information the transaction will be denied, payment will fail, and the service will be discontinued.

Therefore, it is desirable to provide both privacy and security in processing recurrent consumer transactions and to reduce or eliminate fraud stemming from the unauthorized use and re-use of proxy financial information.

SUMMARY OF THE INVENTION

A private and secure payment scheme is disclosed for processing recurrent consumer transactions, such as the purchase of a good or service, via a computer-based communications network, such as the Internet.

In a preferred embodiment, the present invention relates to a method for securely processing recurrent consumer transactions in a communications network-based system. Merchant-specific proxy financial account information is provided to a user that is valid for transactions at a single merchant only. Such "merchant specific" proxy financial information only authorizes a single merchant, and no other merchant, to process payments using the "merchant specific" proxy financial information. The merchant-specific proxy financial account information is preferably stored in a database. A request for transaction approval is received from a merchant, the request including a merchant identifier and a user's proxy financial account information. The database is queried to determine if the proxy financial account is valid for the merchant seeking transaction approval. If the proxy financial account information is valid for the merchant seeking approval, the transaction is approved. However, if the proxy financial account information is not valid for the merchant seeking approval, the transaction is denied.

In a preferred embodiment, the proxy financial account information stored in the database includes a credit card account number. The credit card account number is linked in the database to a merchant identifier string or code. The process of determining if the proxy financial account information is valid for the merchant seeking transaction approval comprises comparing the merchant identifier submitted by the merchant to the merchant identifier stored in the database in association with the credit card account number.

In another preferred embodiment, the proxy financial account information may be a proxy billing address linked to a financial account; and the process of determining if the proxy financial account information is valid comprises comparing the merchant identifier submitted by the merchant to the merchant identifier stored in the database in association with the proxy billing address. Alternatively, the proxy billing address may also include the merchant identifier. A user may also be provided with proxy identity information (e.g., proxy name, proxy phone number, proxy e-mail, proxy shipping address) to ensure privacy.

In another preferred embodiment, the present invention relates to a communications network-based system for securely processing recurrent consumer transactions. The system comprises a server computer including a processor configured to generate merchant-specific proxy financial account information for users, the proxy financial account information valid for transactions at a single merchant only; a database for storing the proxy financial account information; and a communications link for receiving requests for transaction approval from merchants and for transmitting responses to the requests to merchants.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

The present invention relates to the use of "one merchant only," or "merchant-specific," proxy financial information, in support of a recurrent consumer transaction. The merchant specific proxy financial information is reusable by a distinct merchant on a recurrent basis, but by no other merchant. A consumer transaction includes, but is not limited to, the purchase of, or payment for, a good or service provided by a merchant. Unless otherwise indicated expressly or by context, a "good" encompasses a deliverable, including a physical good, an electronic or virtual good and a service which provides a physical, electronic or virtual deliverable. The terms "user", "purchaser", "customer", consumer", "recipient" and "orderer" are used interchangeably unless indicated otherwise expressly or by context. Similarly, the terms "vendor", "retailer", "merchant" or "provider" or "sender" of a good are used interchangeably unless indicated otherwise expressly or by context.

Figure 1:
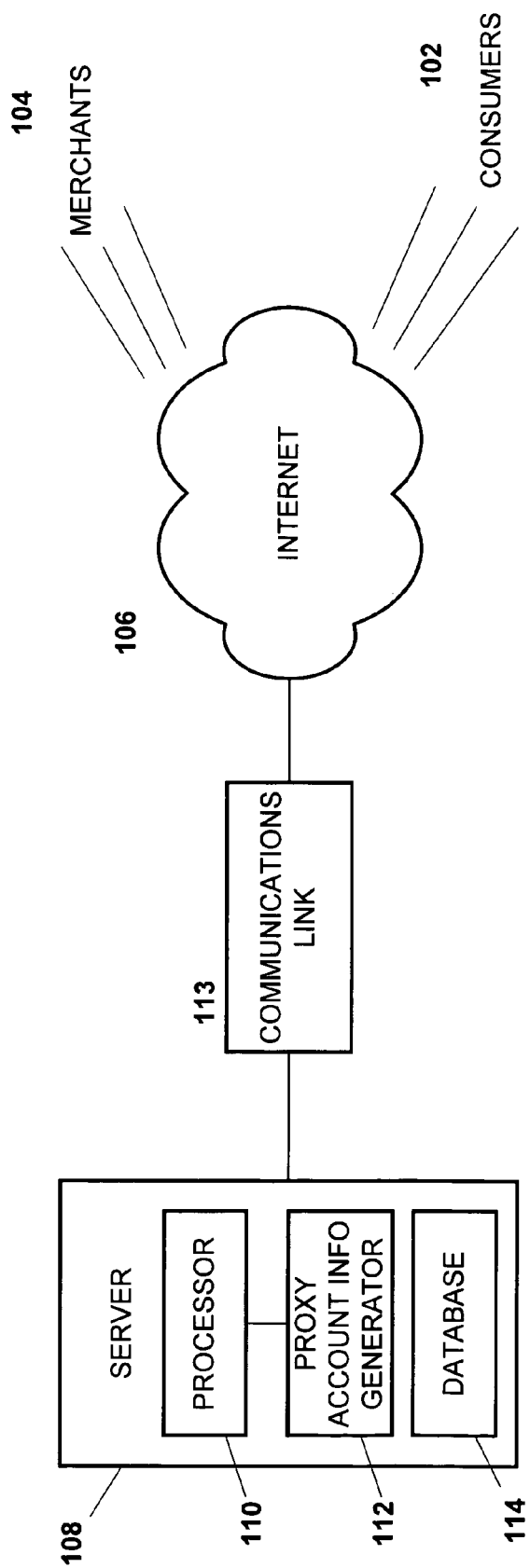
FIG. 1 is a block diagram illustrating the operation of a system of the present invention.

Reference is now made to FIG. 1, which is a block diagram illustrating a typical operation of a system of the present invention. As shown, consumer users 102 browse web sites operated by merchants 104 via the Internet 106. When a user 102 wishes to initiate a private consumer transaction with a merchant 104, a server 108 having a processor 110, which includes a proxy financial account information generator 112, provides the user 102 with proxy financial account information via communications link 113. The proxy financial account information is stored in a database 114 in such a way that it is linked to the merchant who is authorized to use the proxy financial account information. Typically the server is maintained by a bank or other credit card issuer.

In a preferred embodiment of the invention, the user may select between a "one-time" transaction (e.g., single purchase) or a recurrent transaction (e.g., monthly service arrangement). In the case of a "one-time" transaction, the proxy financial account information generator 112 provides user 102 with "single-use" proxy financial account information, which is valid for a single transaction only. In the case of a recurrent transaction, the proxy financial account information generator 112 provides user 102 with merchant specific proxy financial account information, which, as discussed above, is valid for multiple transactions at a distinct merchant. User 102 may also be provided with proxy identity information, such as a proxy name, proxy telephone number, proxy e-mail address, and/or proxy shipping address, to ensure privacy.

In one embodiment, the "merchant specific" proxy financial account information is a proxy credit card account number valid for purchases at a single merchant only. This proxy account number is linked to a user's true account with the issuing bank or credit card company. The proxy financial account information is stored in the database linked to a code that specifically identifies the authorized merchant.

In another embodiment, the proxy financial account information is a proxy billing address and/or a proxy Address Verification System (AVS) string which is valid for transactions at a single merchant only. As known in the art, when the credit card is not physically present, e.g., mail-order, telephone or Internet transactions, a portion of the user's billing address (the AVS string) is extracted and compared to the billing address on file for the user with the issuing bank or credit card company. The AVS string typically consists of the leading numerals in the billing address field, excluding dashes, slashes, and periods, appearing before a blank space is reached, followed by the zip code. For example, for the following address, 87-20 136$^{th}$ Street
Osh Kosh, N.Y. 11218 the AVS string would be "8720, 11218". Typical credit card companies allow AVS strings to be as large as 20-24 characters in length. Credit card numbers, however, are restricted to 16 decimal digits constrained by various fields that identify the issuing bank, or are values dependent upon other portions of the string. This implies that the range of values available for proxy credit card numbers is significantly smaller than the range of values available for AVS strings. Providing a unique proxy credit card number for each transaction, especially long-lived transactions such as recurrent transactions, implies that these numbers will not be readily available to be reassigned or reused in different transactions, and among different users, and thus will be exhausted far faster than proxy AVS strings. A preferred embodiment of the invention, therefore, uses a static proxy credit card number assigned to a user (that does not reveal their real financial information), and an AVS string that varies for each private transaction or each recurrent transaction initiated by the user.

To make a purchase from the merchant, the user provides his or her proxy account information to the merchant 104. The merchant then seeks transaction authentication from the bank or credit card company that issued the proxy account information, or the processor/acquirer who processes transactions on behalf of the bank or credit card issuer, by sending a request for transaction approval, which includes the user's proxy account information and the merchant's identifier code, to server 108 via communications link 113. In the case of a recurrent transaction, processor 110 typically compares the merchant's identifier code submitted by the merchant to the identity of the merchant associated with the proxy account information. If there is a match (i.e., the requesting merchant is the distinct merchant authorized to charge the account), a transaction approval is transmitted to the merchant 104 via communications link 113. However, if there is no match (i.e., the requesting merchant is not authorized to charge the account), the transaction is denied.

Figure 2A:
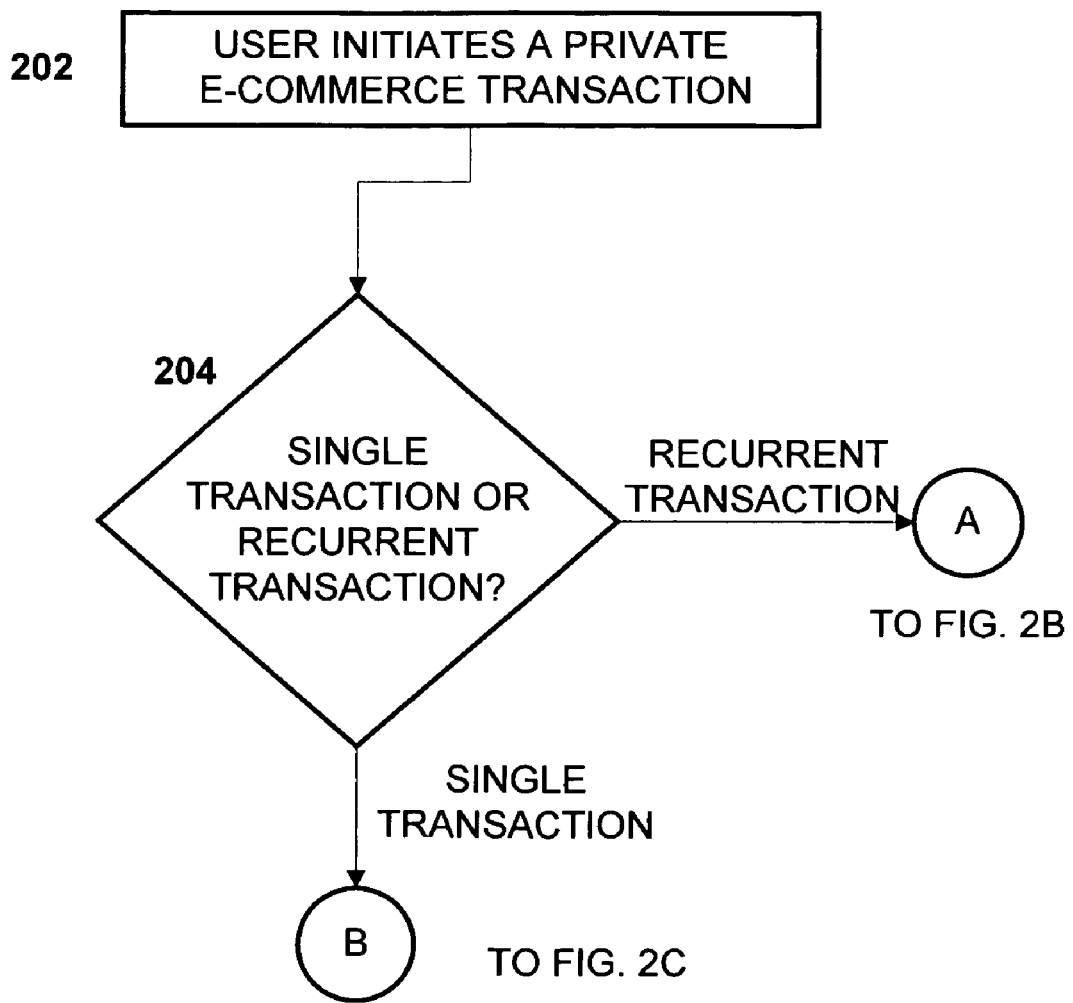
FIG. 2A is a flowchart illustrating the steps in a preferred embodiment of the method of the present invention.

Reference is now made to FIG. 2A, which is a flowchart illustrating the steps in a preferred embodiment of the present invention. In step 202 a user initiates a private e-commerce transaction to purchase a good or service via a communications network, such as the Internet. The user may be accessing the network via a desktop personal computer, a cellular telephone adapted to access the Internet, a wireless communications device (e.g., Palm VII™), or any other device configured to access the Internet. In step 204, the user is prompted to choose between a transaction type—a single (i.e., one-time) transaction or a recurrent transaction. This can be accomplished by providing a typical input/output means on a web page, such as a yes/no button on a pop-up window. An example of a typical recurrent transaction is a subscription to an online magazine, newspaper, or other information providing service. Such services typically charge a fixed time-based fee (e.g., $9.95 per month). Users of such services initially sign up by providing their credit-card and billing information to the service provider. Each month, the service provider submits a bill to the user's credit card company for the monthly fee charged for the type of service selected by the user. Other examples of recurrent transactions include monthly fees for Internet access, billing for a split order where a merchant fulfills only a portion of an order at a given time because other items ordered are out of stock, and fees based on usage of a service, such as replenishment of a computerized toll-paying account (e.g., EZ-PASS™)

Figure 2B:
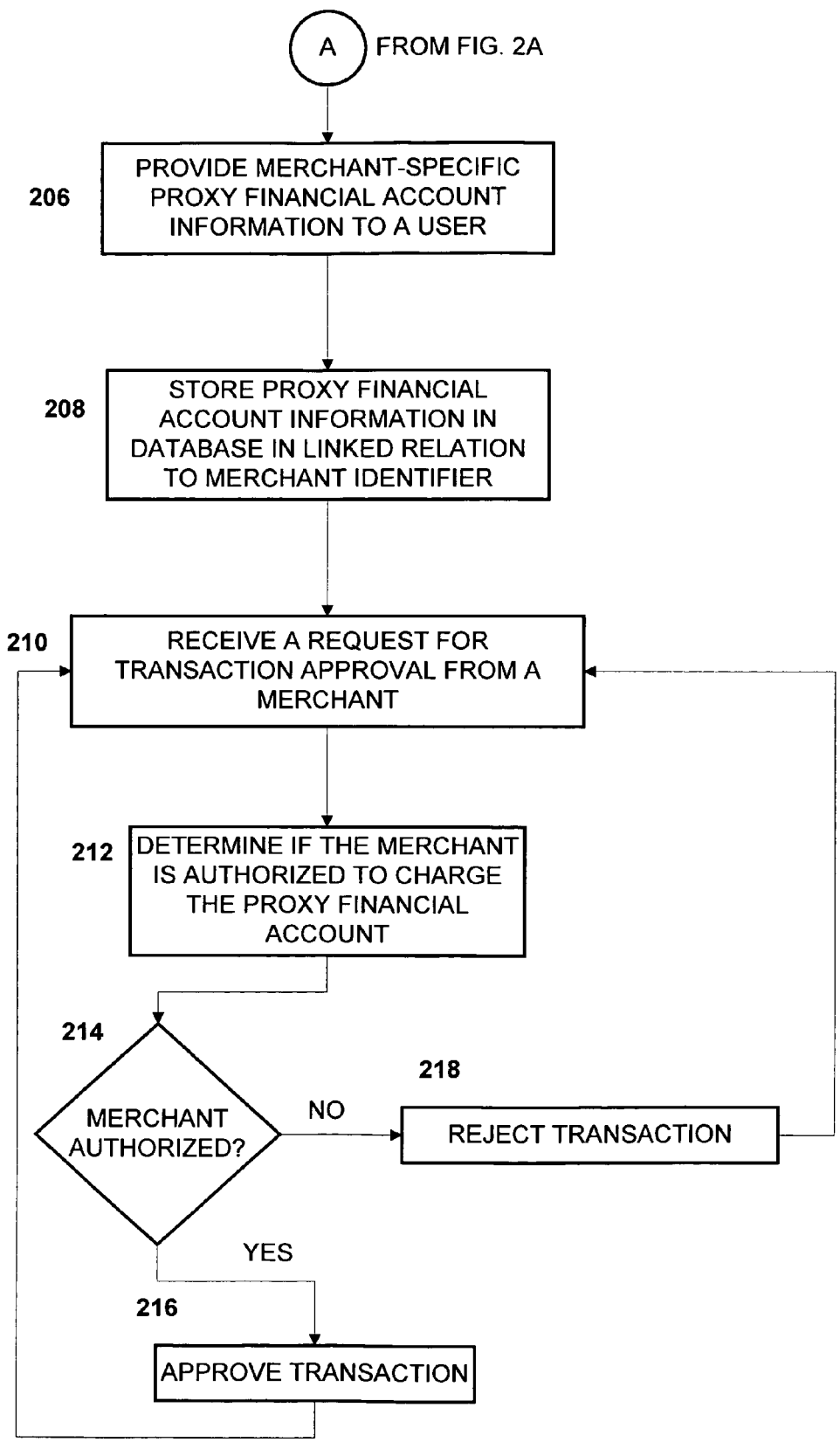
FIG. 2B is a continuation of the flowchart in FIG. 2A, illustrating the steps in a preferred embodiment of the present invention.

If the user chooses a recurrent transaction at step 204, the user is provided with "merchant specific" proxy financial account information by his bank or credit card issuer in step 206 of FIG. 2B. This "merchant specific" proxy financial information can only be used by a single merchant. That single merchant, and only that merchant, can resubmit the proxy financial information to obtain payment authorization by the issuing bank or credit card company in the normal course of its transaction authorization process. Any attempt to use the proxy financial information for payments at any other merchant will fail the authorization process.

In step 208, the proxy financial account information is stored in a database. The authorized merchant's identity information is also stored in the database in linked relation to the proxy financial account information. This linking of the authorized merchant's identity to the user's proxy financial information can be implemented in a variety of ways known to one of ordinarily skill in the art of computer programming and system design. For example, the linking of merchant identity information with proxy financial information may be implemented by a "cross reference table" that associates specific proxy financial information such as a proxy credit card account number with specific merchant identifier codes. Since services like subscriptions may be purchased for long periods of time, the "linked" information advantageously is stored and available for authorization for a sufficient period of time so that users need not reinitiate private purchases.

In another preferred embodiment, a user is provided with a merchant-specific proxy billing address that generates an AVS string that includes as a portion a code that identifies the merchant to whom the user provides the proxy financial information. When the merchant submits this proxy financial information and the AVS string is decoded, the merchant code portion is checked with the identity of the submitting merchant to determine whether or not the authorized merchant submitted the transaction. In this embodiment, the cross reference table is not required since the linking of merchant identity information is performed by including it as a portion of the proxy financial information. It is also possible that a proxy credit card number may be assigned to a user that includes as a portion of the credit card number a code that identifies the authorized merchant. However, as previously noted, the range of values available for credit card numbers may not be sufficiently large enough to encode unique identifiers for merchants, and hence an "AVS string" embodiment provides a preferred solution to encode merchant identity information.

After a user has made a product or service selection and provided his proxy financial information to a merchant, the issuing bank or credit card company receives at step 210 a request for transaction approval from the merchant. As discussed above, the request for transaction approval typically includes a merchant identification code. In step 212, the user's bank or credit card company determines if the merchant submitting the request is authorized to submit charges. In the case where the authorized merchant's identity is linked in a database to the user's proxy financial information, the received proxy financial information is used to recover from the database the associated merchant identity; and the recovered identity is compared in step 214 with the identity of the merchant requesting authorization of the transaction. If the merchant's identity is embedded within the proxy financial account information (e.g., credit card number or AVS string), that identity is recovered from the financial account information and compared in step 214 with the identity of the merchant requesting authorization. If the merchant is authorized, the transaction is approved in step 216. However, if the merchant is not authorized to submit charges using the given proxy financial account information, the transaction is rejected.

It should be understood that the present invention, which can be implemented in a variety of ways via any of the private payment mechanisms and payment media previously disclosed in the prior art, provides both privacy (when users use proxy identity information that secures their true identity) and security from fraud (only one selected merchant can use the information and no other). Even if a user chooses to use his or her real identity when making a purchase using "merchant specific" proxy financial information, their financial information is secured from fraudulent misuse.

It may appear that fraud can still be perpetrated simply by repetitively making purchases using the user's "merchant specific" proxy financial information at the authorized merchant site. This is not the case for several reasons.

First, the proxy financial information available to one merchant includes the same billing and shipping information initially created by the user at the time of the first transaction with the merchant. Thus, a thief or third party who steals the proxy financial information could only use this information with the same merchant who had the copy of the user's address information (either proxy or real) initially provided with the proxy financial information. Such thieves would not be able to reap the rewards of their theft because the purchased products or services would be directed to the user. Thus, since there is no reward, it would make no sense for thieves to conduct such frauds.

For example, in the case where proxy address information was used by a legitimate user to prepay for tolls using the EZ-PASS™ service, a thief would have to steal the user's EZ-PASS™ tag on the windshield of his or her car in order to benefit from any unauthorized use of the anonymous user's financial information. However, since the user is anonymous to the thief, the thief would not know where to go to steal the tag! In another setting of private e-commerce whereby a user provides proxy identity information, the thief would not be able to intercept goods procured through fraud because the thief would not know the electronic identity (email, IP address, etc.) of the anonymous user whose financial information has been stolen.

Furthermore, in the case where a user provides "merchant specific" proxy financial information with either their real identity and real address information, or proxy identity information and proxy financial information, in a secured payment system, any attempt by a thief to change the anonymous user's shipping information to perpetrate the interception would require the thief to disclose his or her own whereabouts to redirect the shipment. Alternatively, such attempts at redirection would be thwarted by typical merchant systems that first seek authorization from a user for change of address information. Such authorization to change any user-supplied identity information is typically secured by PIN's and passwords that are initially created by the user (or alternatively, this information may be assigned by the merchant) who initiated the transaction, and that would otherwise not be known to the thief. An example of this type of secured merchant payment system is Amazon.com's "One Click"™ payment feature.

Finally, banks typically use early fraud warning systems that measure the "volume" and "velocity" of transactions submitted by merchants to customer's accounts. If stolen proxy financial information were used by a thief at a single merchant site, the bank or credit card issuer would very likely deny a large volume of transactions that are too frequently submitted by the merchant. Furthermore, the user may be asked to specify the limits on the amount of the transaction so that recurrently supplied bills (e.g., monthly), or the component bills in the case of split orders, are bounded automatically by the issuing bank during the authorization process by some amount agreed upon by the merchant and user when the transaction is initiated. This information as well may be readily linked with the proxy financial information and used during the bank's authorization process when receiving a request for authorization of a recurrent transaction. The risk of fraudulent transactions using the present invention is therefore significantly reduced if not entirely eliminated.

Figure 2C:
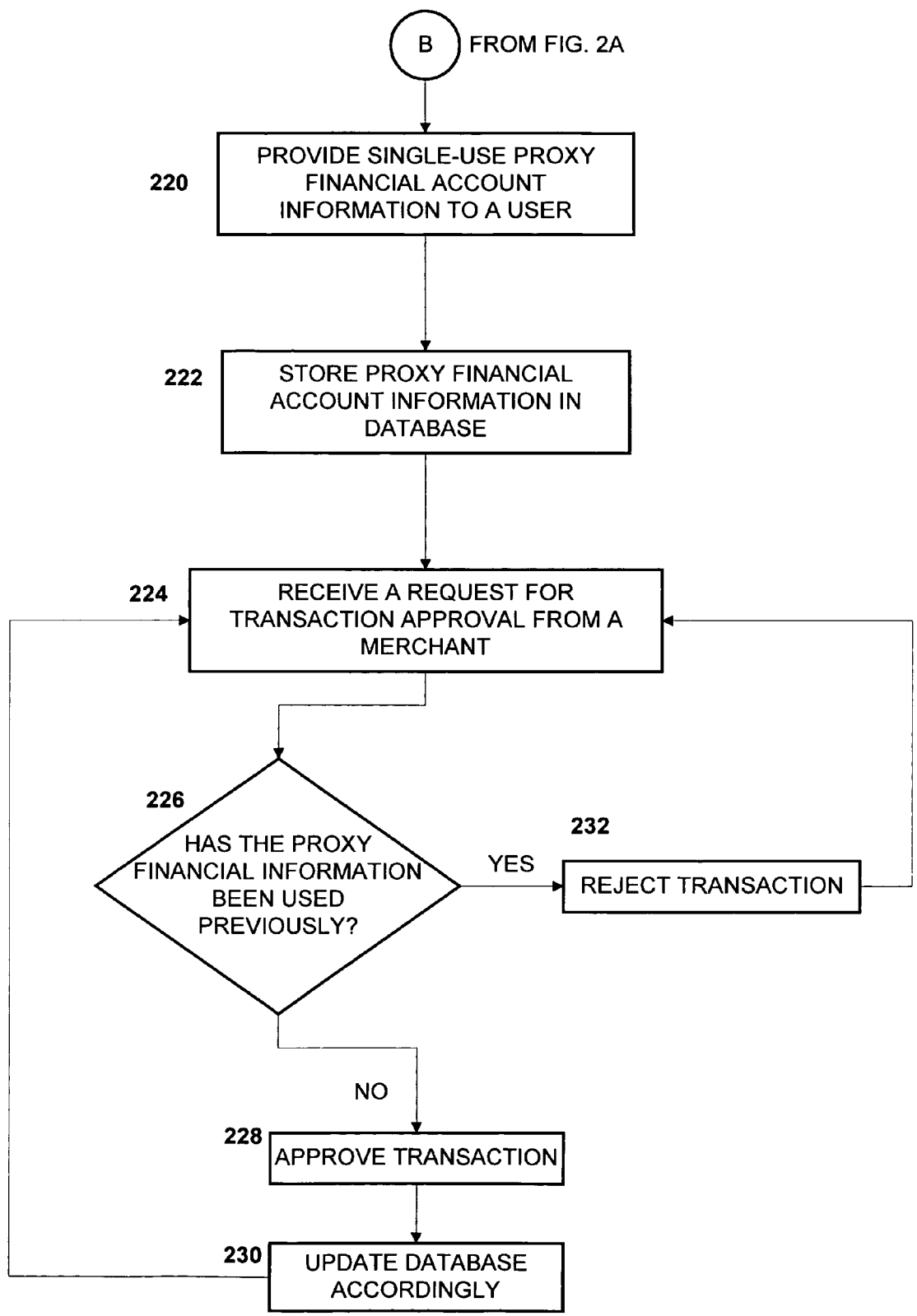
FIG. 2C is a continuation of the flowchart in FIG. 2A, illustrating the steps in a preferred embodiment of the present invention.

Returning to step 204, in order to further reduce the risk of fraud, at the time the user initiates a private transaction (at the time of check out at a web site), using for example a wallet, or some other means or device for managing private transactions, the user is asked to indicate whether the transaction is for a single one time purchase of a good or service, or instead is a recurrent transaction. If the user chooses a single transaction at step 204, the user is provided with "single use" proxy financial account information in step 220 of FIG. 2C. Thus, the user's bank or credit card company issues "one time only" proxy financial information which is good for a single transaction only at any merchant. In step 222, the proxy financial information is stored in a database. After a user makes a product or service selection at a merchant and confirms his or her desire to complete a transaction, the merchant submits a request for transaction approval in step 224. In step 226, a test is made to determine if the "single use" proxy financial account information has been previously used. Typically, the bank or credit card company will query the database of proxy financial account information to determine if the account has been used already. If the "single use" account has been used previously, the transaction is rejected in step 232. If the "single use" account has not been previously used, and is therefore valid, the transaction is approved in step 228. The database would then be updated to reflect that the "single use" account is no longer valid in step 230.

It should be evident to anyone ordinarily skilled in the state of the art that the present invention can be readily implemented by various private transaction means and for a wide variety of payment media, methods and services. Furthermore, it is clear that the method provides for end-to-end private e-commerce transactions in the most general case of service contracts, and purchases of digital media including recurrent transactions of the sort typical of subscription or information services.

While the present invention has been described with reference to the preferred embodiments, those skilled in the art will recognize that numerous variations and modifications may be made without departing from the scope of the present invention. Accordingly, it should be clearly understood that the embodiments of the invention described above are not intended as limitations on the scope of the invention, which is defined only by the following claims.

What is claimed is:

1. A method for securely processing recurrent consumer transactions comprising:
   providing merchant-specific proxy financial account information to a user, the proxy financial account information valid for multiple transactions at a single merchant only;
   maintaining with a computer a database of the merchant-specific proxy financial account information;
   receiving at the computer a request for transaction approval from a merchant, the request including a merchant identifier and a user's proxy financial account information; and
   querying the database with the computer to determine if the proxy financial account information is valid for the merchant seeking transaction approval.

2. The method of claim 1, further comprising either approving the transaction if the proxy financial account information is valid for the merchant seeking approval, or rejecting the transaction if the proxy financial account information is not valid for the merchant seeking approval.

3. The method of claim 1, wherein the proxy financial account information includes a credit card account number.

4. The method of claim 3, wherein the credit card account number includes a merchant identifier string.

5. The method of claim 3, wherein the proxy financial account information stored in the database includes a merchant identifier stored in linked relation to the credit card account number.

6. The method of claim 5, wherein the step of querying the database further comprises comparing the merchant identifier submitted by the merchant to the merchant identifier stored in the database.

7. The method of claim 1, wherein the proxy financial account information is a proxy billing address linked to a financial account.

8. The method of claim 7, wherein the proxy billing address includes a merchant identifier string.

9. The method of claim 1, wherein the communications network is the Internet.

10. The method of claim 1, further comprising the step of providing proxy identity information to a user.

11. The method of claim 1 wherein the proxy financial account information is a proxy Address Verification System string.

12. A communications network-based system for securely processing recurrent consumer transactions comprising:
   a server computer including:
   a processor configured to generate merchant-specific proxy financial account information for users, the proxy financial account information valid for multiple transactions at a single merchant only;
   a database for storing the proxy financial account information; and
   a communications link for receiving requests for transaction approval from merchants and for transmitting responses to the requests to merchants.

13. The system of claim 12, wherein the proxy financial account information includes a credit card account number.

14. The system of claim 13, wherein the credit card account number includes a merchant identifier string.

15. The system of claim 13, wherein the proxy financial account information stored in the database includes a merchant identifier stored in linked relation to the credit card account number.

16. The system of claim 12, wherein the proxy financial account information is a proxy billing address linked to a financial account.

17. The system of claim 15, wherein the proxy billing address includes a merchant identifier string.

18. The system of claim 12, wherein the communications network is the Internet.

19. The system of claim 12, wherein the processor is further configured to generate proxy identity information for users.

20. The system of claim 12 wherein the proxy financial account information is a proxy Address Verification System string.

21. A non-transitory computer readable medium containing computer instructions that when executed by a computer perform the steps of:
   providing merchant-specific proxy financial account information to a user, the proxy financial account information valid for multiple transactions at a single merchant only;
   maintaining a database of the merchant-specific proxy financial account information;
   receiving a request for transaction approval from a merchant, the request including a merchant identifier and a user's proxy financial account information; and
   determining if the proxy financial account information is valid for the merchant seeking transaction approval.

22. The computer readable medium of claim 21 further containing computer instructions that when executed by a computer perform the step of approving the transaction if the proxy financial account information is valid for the merchant seeking approval, or rejecting the transaction if the proxy financial account information is not valid for the merchant seeking approval.

23. The computer readable medium of claim 21, wherein the proxy financial account information includes a credit card account number.

24. The computer readable medium of claim 23, wherein the credit card account number includes a merchant identifier string.

25. The computer readable medium of claim 23, wherein the proxy financial account information stored in the database includes a merchant identifier stored in linked relation to the credit card account number.

26. The computer readable medium of claim 25 further containing computer instructions that when executed by a computer perform the step of comparing the merchant identifier submitted by the merchant to the merchant identifier stored in the database.

27. The computer readable medium of claim 21, wherein the proxy financial account information is a proxy billing address linked to a financial account.

28. The computer readable medium of claim 27, wherein the proxy billing address includes a merchant identifier string.

29. The computer readable medium of claim 21, wherein the communications network is the Internet.

30. The computer readable medium of claim 21 further containing computer instructions that when executed by a computer perform the step of providing proxy identity information to users.

31. A method for securely processing consumer transactions comprising:
   querying the user to determine if the transaction is a single transaction or a recurrent transaction;

if the transaction is a single transaction, providing single-use proxy financial account information to a user, the proxy financial account information valid for a single transaction only;

if the transaction is a recurrent transaction, providing merchant-specific proxy financial account information to a user, the proxy financial account information valid for multiple transactions at a single merchant only;

maintaining with a computer a database of the proxy financial account information;

receiving at the computer a request for transaction approval from a merchant, the request including a user's proxy financial account information; and querying the database with the computer to determine if the proxy financial account information is valid for the transaction.

32. The method of claim 31, wherein the communications network is the Internet.

33. The method of claim 31, further comprising the step of providing proxy identity information to users.

34. The software program of claim 21 wherein the proxy financial account information is a proxy Address Verification System string.

35. The method of claim 31 wherein the proxy financial account information is a proxy Address Verification System string.

\* \* \* \* \*